United States Patent
Moon et al.

(10) Patent No.: US 8,510,362 B2
(45) Date of Patent: Aug. 13, 2013

(54) APPARATUS AND METHOD FOR VARIABLE FAST FOURIER TRANSFORM

(75) Inventors: Young-Jin Moon, Daejeon (KR); Hyun-Jae Kim, Incheon (KR); Ki-Seok Kim, Gyeongju-si (KR); Young-Il Kim, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 1101 days.

(21) Appl. No.: 12/517,781

(22) PCT Filed: Jun. 18, 2007

(86) PCT No.: PCT/KR2007/002950
§ 371 (c)(1),
(2), (4) Date: Jun. 4, 2009

(87) PCT Pub. No.: WO2008/069382
PCT Pub. Date: Jun. 12, 2008

(65) Prior Publication Data
US 2010/0011046 A1    Jan. 14, 2010

(30) Foreign Application Priority Data
Dec. 8, 2006  (KR) .................. 10-2006-0124508

(51) Int. Cl.
*G06F 17/14*  (2006.01)
(52) U.S. Cl.
USPC ........................................................ 708/404
(58) Field of Classification Search
USPC ............... 708/400, 401, 402, 403, 404, 405, 708/406, 407, 408, 409, 410
See application file for complete search history.

(56) References Cited

U.S. PATENT DOCUMENTS

| | | | |
|---|---|---|---|
| 6,366,937 B1 | 4/2002 | Shridhar et al. | |
| 6,549,925 B1 * | 4/2003 | Amrany et al. | 708/404 |

(Continued)

FOREIGN PATENT DOCUMENTS

| | | |
|---|---|---|
| KR | 10-0576520 B1 | 4/2006 |
| KR | 10-2006-0039602 A | 5/2006 |

(Continued)

OTHER PUBLICATIONS

Hung et al., Design of an Efficient Variable-Length FFT Processor, Department of Electronics Engineering & Institute of Electronics National Chiao-Tung University, 2004.

*Primary Examiner* — Albert Phillips, III
(74) *Attorney, Agent, or Firm* — Jefferson IP Law, LLP

(57) ABSTRACT

The present invention relates to an apparatus and method for variable fast Fourier transform. According to an embodiment of the present invention, two n-point fast Fourier transform (FFT) processors are used to generate two n-point FFT output data or one 2n-point FFT output data. The one 2n-point input data is alternately input to the two n-point FFT processors. Each of the two n-point FFT processors selects a twiddle factor for the n-point input data or the 2n-point input data and performs fast Fourier transform. A butterfly operation is performed on signals obtained by performing fast Fourier transform on the 2n-point input data signal, and the processed signals are aligned in an output order. According to this structure, it is possible to realize a fast Fourier transform hardware engine that selectively performs multi-frequency allocation in a base station system that supports the multi-frequency allocation.

13 Claims, 7 Drawing Sheets

(56) References Cited

U.S. PATENT DOCUMENTS

| | | |
|---|---|---|
| 6,615,227 B2 * | 9/2003 | Aizenberg et al. ............ 708/404 |
| 6,728,742 B1 * | 4/2004 | Hertz ............................ 708/404 |
| 2006/0093052 A1 | 5/2006 | Cho et al. |
| 2006/0143258 A1 | 6/2006 | Teng et al. |
| 2006/0248135 A1 * | 11/2006 | Cousineau et al. ........... 708/404 |
| 2006/0271613 A1 * | 11/2006 | Mitsuishi et al. ............. 708/404 |
| 2007/0201354 A1 | 8/2007 | Oh et al. |

FOREIGN PATENT DOCUMENTS

| | | |
|---|---|---|
| KR | 10-2006-0083664 A | 7/2006 |
| KR | 10-0628303 B1 | 9/2006 |
| WO | 2005/057423 A2 | 6/2005 |

\* cited by examiner

APPARATUS AND METHOD FOR VARIABLE FAST FOURIER TRANSFORM

TECHNICAL FIELD

The present invention relates to an apparatus and method for variable fast Fourier transform. More particularly, the present invention relates to an apparatus and method for performing variable fast Fourier transform to generate multiple fast Fourier transform output data having a variable size.

BACKGROUND ART

A fast Fourier transform (FFT) technique is for converting signals in a time domain into signals in a frequency domain or for converting signals in the frequency domain into signals in the time domain.

The FFT technique has come into widespread use for various digital signal processing fields, such as the communication signal processing field and the image signal processing field.

Particularly, the FFT technique is essential to an OFDM (orthogonal frequency division multiplexing) wireless communication system that is suitable for processing data at a very high speed in a wireless communication environment including a multi-path fading environment.

The size of fast Fourier transform required for various communication fields depends on the specifications of each system.

For example, a communication system, such as ADSL (asymmetrical digital subscriber line), requires a 512-point fast Fourier transform size, and a high-speed portable Internet system, such as WiBro, requires a 1024-point fast Fourier transform size.

In addition, an upgraded WiBro system that will be developed in the near future is expected to selectively use various bands, such as a 10 MHz band, a 20 MHz band, and a 40 MHz band, according to a wireless communication environment and system specifications.

In this case, in order to support the system specifications, each base station needs to have various fast Fourier transform sizes and to output multiple fast Fourier transform data.

For example, four 1024-point fast Fourier transform hardware engines and two 2048-point fast Fourier transform hardware engines are needed to realize a base station system for allowing a wireless communication system to selectively use various bands, such as four 10 MHz bands and two 20 MHz bands, required for the upgraded WiBro system.

In addition, both the 1024-point fast Fourier transform hardware engine and the 2048-pointer fast Fourier transform hardware engine should be provided in order to change to various bands during the connection of a base station.

In order to solve the above-mentioned problems, a method of providing every available fast Fourier transform hardware engine in a base station has been proposed.

However, in this case, some of the fast Fourier transform hardware engines may not be used at all, which results in an increase in the cost of the system. In addition, the method has a problem in that system space is reduced.

Further, a method of using a variable fast Fourier transform hardware engine that supports 1024 points and 2048 points has been proposed.

However, in the variable fast Fourier transform hardware configuration, one 2048-point fast Fourier transform hardware engine is used to form a 1024-point fast Fourier transform hardware engine, which results in unnecessary consumption of hardware resources.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide an apparatus and method for variable fast Fourier transform that can output multiple Fourier transform data having a variable size by variously combining the smallest hardware components.

Technical Solution

In order to achieve the object, according to an embodiment of the invention, there is provided an apparatus for performing a variable fast Fourier transform (FFT) algorithm.

The apparatus includes a first storage unit that stores a first twiddle factor for fast Fourier transform of n-point input data (n is a specific number), a second storage unit that stores a second twiddle factor for fast Fourier transform of 2n-point input data, and a multiplexer that receives the twiddle factor from the first storage unit or the second storage unit according to whether the n-point input data or the 2n-point input data is supplied.

According to another embodiment of the invention, there is provided an apparatus for performing a variable fast Fourier transform (FFT) algorithm.

The apparatus includes: two n-point FFT processors (n is a specific number) each of which selects an FFT twiddle factor for n-point input data or 2n-point input data, and performs fast Fourier transform; an input data aligning unit that classifies the 2n-point input data and alternately inputs the classified data to the two n-point FFT processors; a butterfly operation unit that receives data obtained by performing fast Fourier transform on the 2n-point input data from the two n-point FFT processors and performs a butterfly operation on the received data; and an output data aligning unit that receives the operated data from the butterfly operation unit and aligns the received data in an output order.

According to still another embodiment of the invention, there is provided a variable fast Fourier transform method using an apparatus for performing fast Fourier transform (FFT) on n-point input data (n is a specific number) or 2n-point input data.

The method includes: determining whether the n-point input data or the 2n-point input data is supplied; when the n-point input data is supplied, selecting a twiddle factor for the n-point input data; when the 2n-point input data is supplied, selecting a twiddle factor for the 2n-point input data; and performing fast Fourier transform using the selected twiddle factor.

According to yet another embodiment of the invention, there is provided a variable fast Fourier transform method using an apparatus for performing fast Fourier transform (FFT) on n-point input data (n is a specific number) or 2n-point input data.

The method includes: receiving the n-point input data or the 2n-point input data; when the n-point input data is received, performing the fast Fourier transform using a twiddle factor for the n-point input data to generate a first output; and when the 2n-point input data is received, performing the fast Fourier transform using a twiddle factor for the 2n-point input data to generate a second output.

ADVANTAGEOUS EFFECTS

As described above, according to the exemplary embodiments of the present invention, it is possible to provide a multi-size multi-output FFT hardware configuration that supports an efficient multi-frequency allocating system by using only minimum hardware requirements in a multi-frequency allocating base station system requiring FFT hardware engines having various sizes.

BEST MODE FOR CARRYING OUT THE INVENTION

Figure 1:
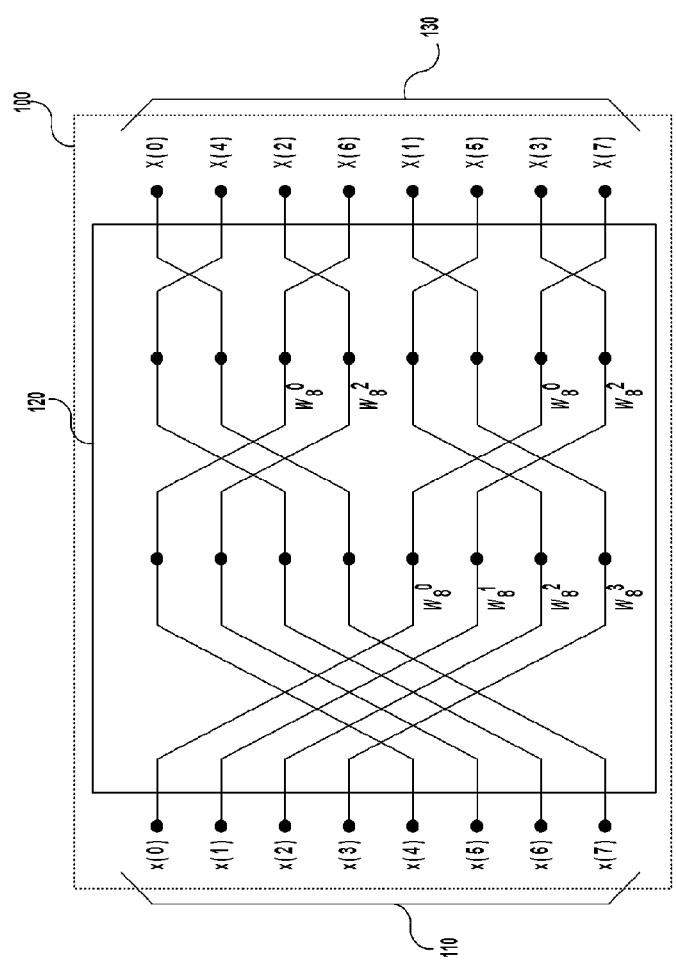
FIGS. 1 and 2 is a diagram illustrating the conception of fast Fourier transform according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, an apparatus and method for variable fast Fourier transform according to an exemplary embodiment of the present invention will be described in detail with reference to the accompanying drawings.

Figure 2:
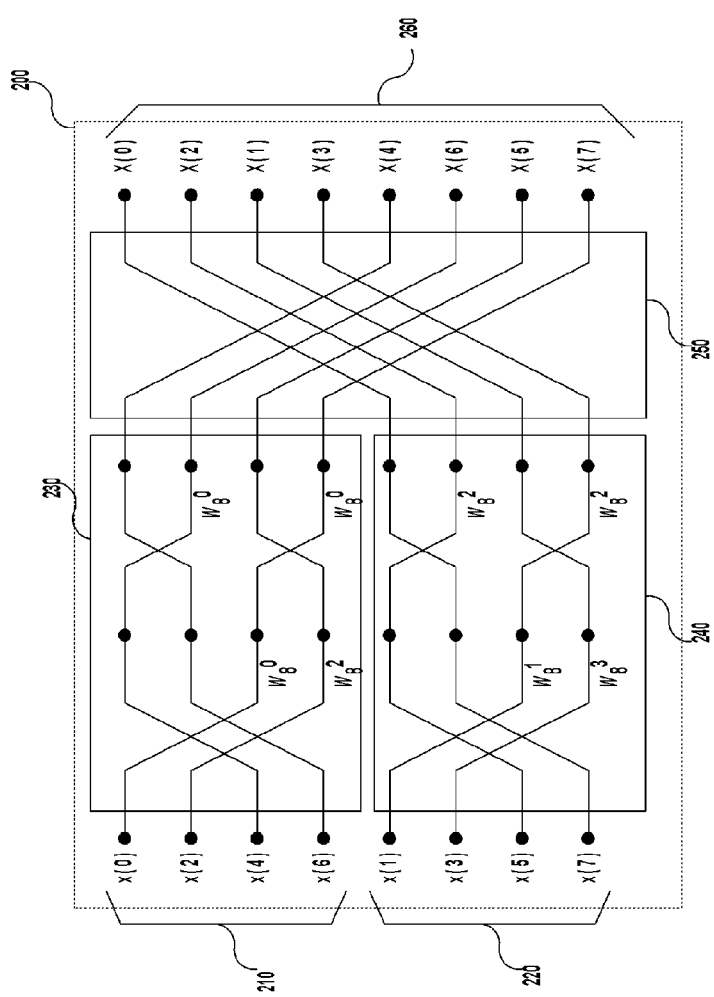

FIGS. 1 and 2 are diagrams illustrating the conception of the variable fast Fourier transform according to an exemplary embodiment of the present invention.

FIGS. 1 and 2 show the flow of butterfly signals in order to describe the conception of the variable fast Fourier transform according to an exemplary embodiment of the present invention, giving an example in which two 4-point fast Fourier transform (hereinafter, referred to as FFT ) hardware components are used to generate an 8-point FFT output.

FIG. 1 shows the flow of signals in an 8-point FFT butterfly unit 100 using a Radix-2 structure according to the related art, and FIG. 2 shows the flow of signals in an 8-point FFT butterfly unit 200 according to an exemplary embodiment of the present invention.

In FIG. 2, two 4-point FFT butterfly units 230 and 240 using the Radix-2 structure according to the related art are used to form the 8-point FFT butterfly unit 200.

As can be seen from the comparison between FIG. 1 and FIG. 2, in FIG. 1, data 110 is sequentially input to the 8-point FFT butterfly unit(120), but in FIG. 2, data 210 and 220 are alternately input to the 4-point FFT butterfly units 230 and 240.

That is, even-numbered data 210 is input to the upper 4-point FFT butterfly unit 230. Odd-numbered data 220 is input to the lower 4-point FFT butterfly unit 240.

In this case, each of the 4-point FFT butterfly units 230 and 240 performs multiplication on an 8-point FFT twiddle factor, not a 4-point FFT twiddle factor.

In addition, finally, a Radix-2 butterfly unit 250 performs an operation on the results output from the 4-point FFT butterfly units 230 and 240. Then, signals output from the Radix-2 butterfly 250 are sequentially aligned to generate an 8-point FFT output signal 260.

In this case, an aligned 8-point FFT output signal 260 shown in FIG. 2 is different fro m an 8-point FFT output signal 130 shown in FIG. 1. That is, in FIG. 2, the 8-point FFT output signal 260 is finally generated by output order alignment that differs from bit reversed output order alignment shown in FIG. 1.

A 4-point fast Fourier transform processor is configured as shown in FIG. 2.

Figure 3:
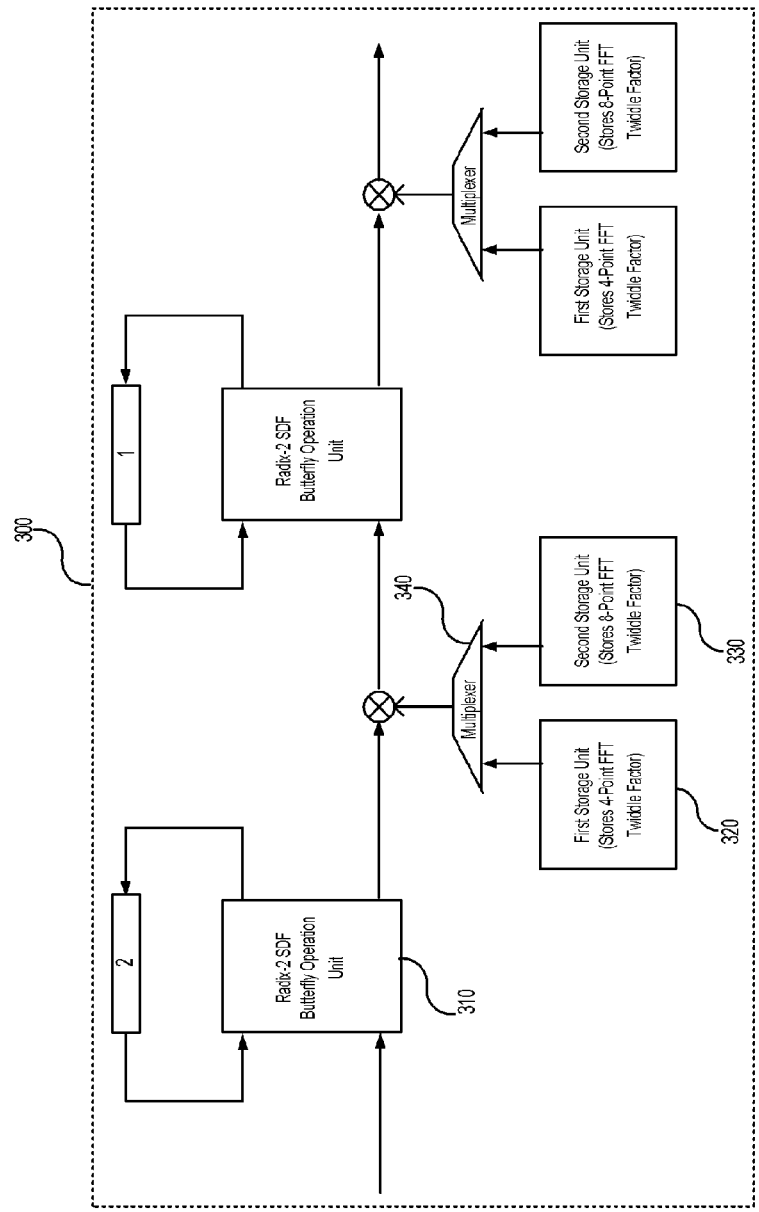
FIG. 3 is a diagram illustrating the hardware structure of a 4-point fast Fourier transform processor according to an exemplary embodiment of the present invention.

FIG. 3 is a diagram illustrating the hardware configuration of a 4-point FFT processor according to an exemplary embodiment of the present invention.

As shown in FIG. 2, a 4-point FFT processor 300 is configured on the basis of a pipelined SDF (single-path delay feedback) Radix-2 structure.

The 4-point FFT processor 300 includes a Radix-2 butterfly operation unit 310, a first storage unit 320, a second storage unit 330, and a multiplexer 340.

The Radix-2 butterfly operation unit 310 performs a butterfly operation on input data, that is, 4-point input data or 8-point input data.

The first storage unit 320 stores a twiddle factor for 4-point FFT.

The second storage unit 330 stores a twiddle factor for 8-point FFT.

The multiplexer 340 receives the twiddle factors output from the first storage unit 320 and the second storage unit 330 and outputs the twiddle factors. The multiplexer 340 determines whether to select the twiddle factor stored in the first storage unit 320 or the twiddle factor stored in the second storage unit 330 according to whether the 4-point input data or the 8-point input data is input.

Next, a variable fast Fourier transform according to an embodiment of the invention will be described below on the basis of the structure of the 4-point FFT processor with reference to FIGS. 3 and 4.

Figure 4:
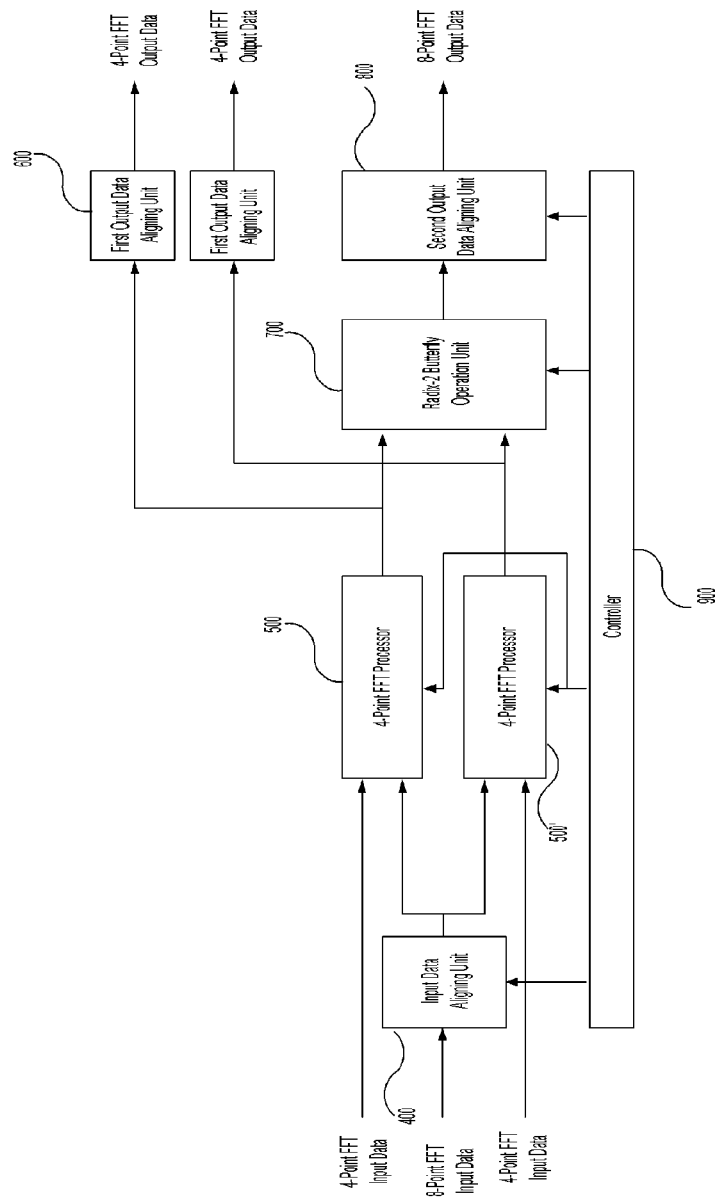
FIG. 4 is a diagram illustrating the hardware structure of an 8-point fast Fourier transform apparatus using the 4-point fast Fourier transform processor according to an exemplary embodiment of the present invention.

First, FIG. 4 is a diagram illustrating the hardware structure of an 8-point FFT apparatus using the 4-point FFT processor according to an exemplary embodiment of the present invention. Referring to FIG. 4, the 8-point FFT apparatus includes an input data aligning unit 400, two 4-point FFT processors 500 and 500' a first output data aligning unit 600, a Radix-2 butterfly operation unit 700, a second output data aligning unit 800, and a controller 900 as hardware components.

The input data aligning unit 400 sorts 8-point FFT input data and alternately outputs the sorted data to the two 4-point FFT processor 500 and 500' That is, a first 4-point FFT input is output to the upper 4-point FFT processor 500, and a second 4-point FFT input is output to the lower 4-point FFT 500'.

The two 4-point FFT processors 500 and 500' have the same hardware configuration as shown in FIG. 2.

The two 4-point FFT processors 500 and 500' each receive 4-point FFT input data or 8-point FFT input data. When the 4-point FFT input data is input, each of the two 4-point FFT processors 500 and 500' selects a 4-point FFT twiddle factor to perform a multiplication. When the 8-point input data is input, each of the two 4-point FFT processors 500 and 500' selects an 8-point FFT twiddle factor to perform a multiplication.

The number of first output data aligning units 600 is equal to the number of 4-point FFT processors. The first output data aligning units 600 align signals that have been subjected to 4-point fast Fourier transform by the 4-point FFT processors 500 and 500' in a simple bit reversed output order. Then, the first output data aligning units 600 generate FFT output signals that are aligned in an order, that is, a plurality of 4-point FFT output data.

The Radix-2 butterfly operation unit 700 receives 8-point FFT signals from the two 4-point FFT processors 500 and 500' performs a butterfly operation on the received signals, and outputs the processed signals.

The second output data aligning unit 800 aligns signals that have been subjected to the butterfly operation by the Radix-2 butterfly operation unit 700 in an output order and outputs the aligned signals. In this case, the output order alignment differs from that of the first output data aligning unit 600. In this way, after the second output data aligning unit 800 aligns signals in an output order, one 8-point FFT output data is generated on the basis of two 4-point FFT input data.

The controller 900 controls the input data aligning unit 400, the two 4-point FFT processors 500 and 500' the Radix-2 butterfly operation unit 700, and the second output data aligning unit 800 to generate two 4-point FFT output signals or one 8-point FFT output data on the basis of two 4-point FFT input data.

Figure 5:
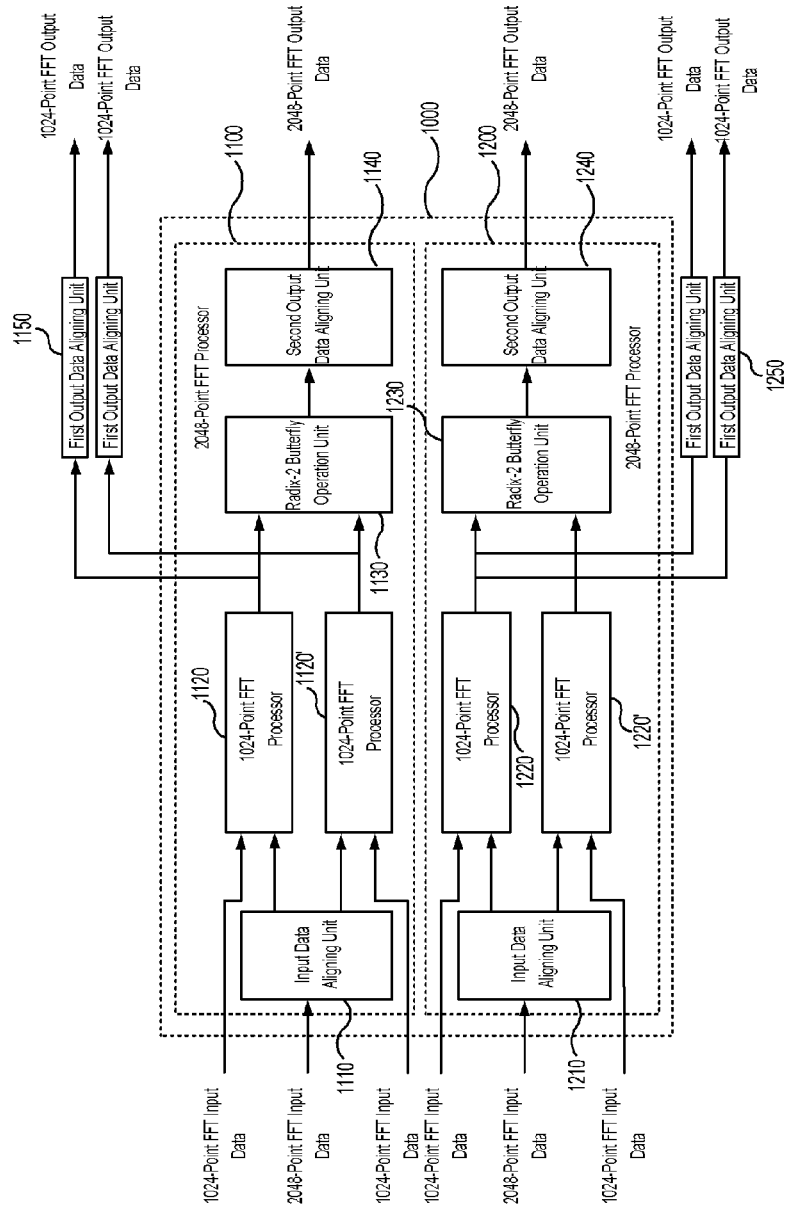
FIG. 5 is a diagram illustrating the hardware structure of a variable fast Fourier transform apparatus using a 1024-point fast Fourier transform processor according to another exemplary embodiment of the present invention.

FIG. 5 is a diagram illustrating the hardware configuration of a variable FFT apparatus using a 1024-point FFT processor according to another exemplary embodiment of the present invention. Referring to FIG. 4, a variable FFT apparatus 1000 can generate selective multiple outputs in an OFDM base station system that should support four 10 MHz bands or two 20 MHz bands, which are substantially available, according to various combinations, such as four 1024-point FFT outputs corresponding to a 10 MHz band or two 2048-point FFT outputs corresponding to a 20 MHz band, or a 2048-point FFT output and two 1024-point FFT outputs corresponding to a 20 MHz band and two 10 MHz bands.

The variable FFT apparatus 1000 includes a plurality of 1024-point FFT processors 1120, 1120' 1210, and 1210' and the hardware configuration of each of the 1024-point FFT processors 1120, 1120' 1220, and 1220' is the same as that of the 4-point FFT processor 300 shown in FIG. 2.

That is, the variable FFT apparatus 1000 includes a Radix-2 butterfly operation unit, a first storage for storing a 1024-point FFT twiddle factor, a second storage unit for storing a 2048-point FFT twiddle factor, and a multiplexer for selecting a twiddle factor according to whether 1024-point FFT data or 2048-point FFT data is input.

The variable FFT apparatus 1000 that uses the 1024-point FFT processors 1120, 1120' 1220, and 1220' to generate two 2048-point FFT output signals includes two 2048-point FFT processors 1100 and 1200.

The two 2048-point FFT processors 1100 and 1200 include input data aligning units 1110 and 1210, four 1024-point FFT processors 1120, 1120' 1220, and 1220' Radix-2 butterfly operation units 1130 and 1230, second output data aligning units 1140 and 1240, and first output data aligning units 1150 and 1250, respectively.

This structure makes it possible to use four 1024-point FFT input data and two 2048-point FFT input data input for the two 2048-point FFT processors 1100 and 1200 to select input data according to various combinations of base stations.

First, 4 1024-point FFT input data are respectively input to the 1024-point FFT fast processors 1120, 1120' 1220, and 1220' of the variable FFT apparatus 1000.

Then, the 1024-point FFT processors 1120, 1120' 1220, and 1220' use 1024-point FFT twiddle factors to perform fast Fourier transform and output the transformed data.

The output signals are input to the corresponding first output data aligning units 1150 and 1250, and then the first output data aligning units 1150 and 1250 perform the signals on output order alignment according to a simple bit reversed output to finally generate four 1024-point FFT output data.

Then, when two 2048-point FFT input data are input to the variable FFT apparatus 1000, the input data aligning unit 1110 inputs first input data to the upper 1024-point FFT processors 1120 and 1220, and the input data aligning unit 1210 inputs second input data to the lower 1024-point FFT processors 1120 and 1220' That is, the input data aligning units 1110 and 1210 alternately input data to the upper 1024-point FFT processors 1120 and 1220 and the lower 1024-point FFT processors 1120'and 1220'.

Then, each of the 1024-point FFT processors 1120, 1120' 1220, and 1220' selects a 2048-point FFT twiddle factor, performs a multiplication on the data, and outputs the processed signal.

The output signals are input to the Radix-2 butterfly operation units 1130 and 1230. Then, the Radix-2 butterfly operation units 1130 and 1230 perform a butterfly operation on the input signals and output the processed signals to the second output data aligning units 1140 and 1240.

Subsequently, the second output data aligning units 1140 and 1240 align the input signals in an output order to generate two 2048-point FFT output data.

Next, a method for variable fast Fourier transform that generates multiple outputs on the basis of various combinations of a plurality of FFT processors having the above-mentioned structure will be described below.

Figure 6:
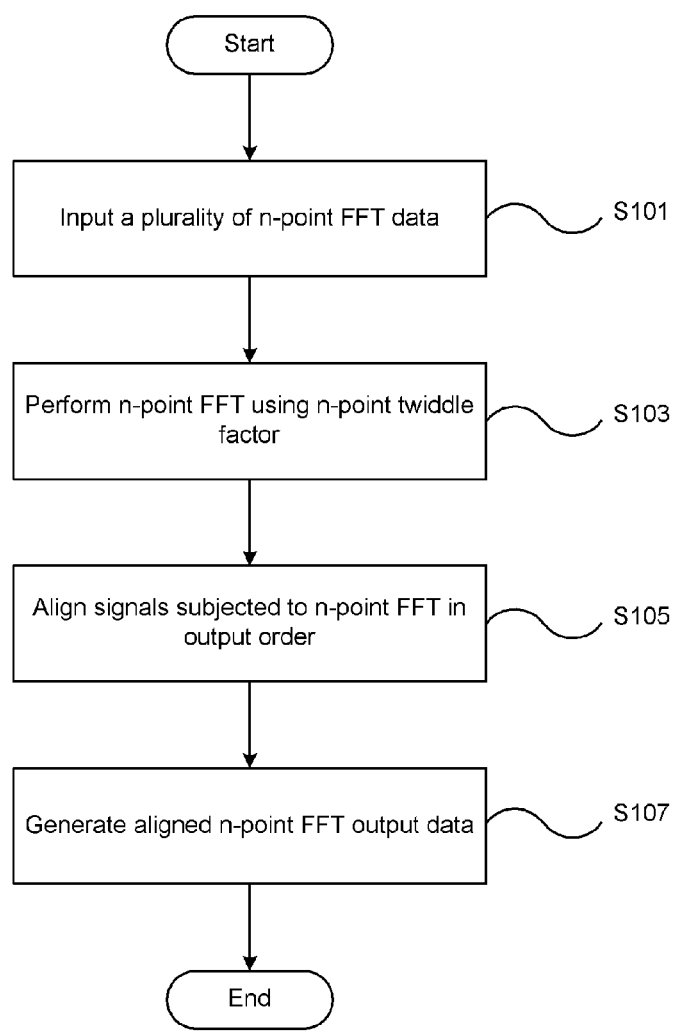
FIG. 6 is a flowchart illustrating a method of performing variable fast Fourier transform on n-point input data according to an exemplary embodiment of the present invention.

FIG. 6 is a flowchart illustrating a method of performing variable fast Fourier transform on n-point input data according to an exemplary embodiment of the present invention.

The flowchart shown in FIG. 6 corresponds to the structure shown in FIG. 4 and FIG. 5 in which 4-point FFT input data or 1024-point FFT input data is supplied.

That is, the variable FFT apparatus receives a plurality of n-point input data (S101).

Then, n-point FFT twiddle factors for the n-point input data are selected to perform fast Fourier transform (S103).

Subsequently, the signals that have been subjected to fast Fourier transform by using the n-point FFT twiddle factors are aligned in an output order (S105).

Then, a plurality of aligned n-point FFT output signals are generated (S107).

Figure 7:
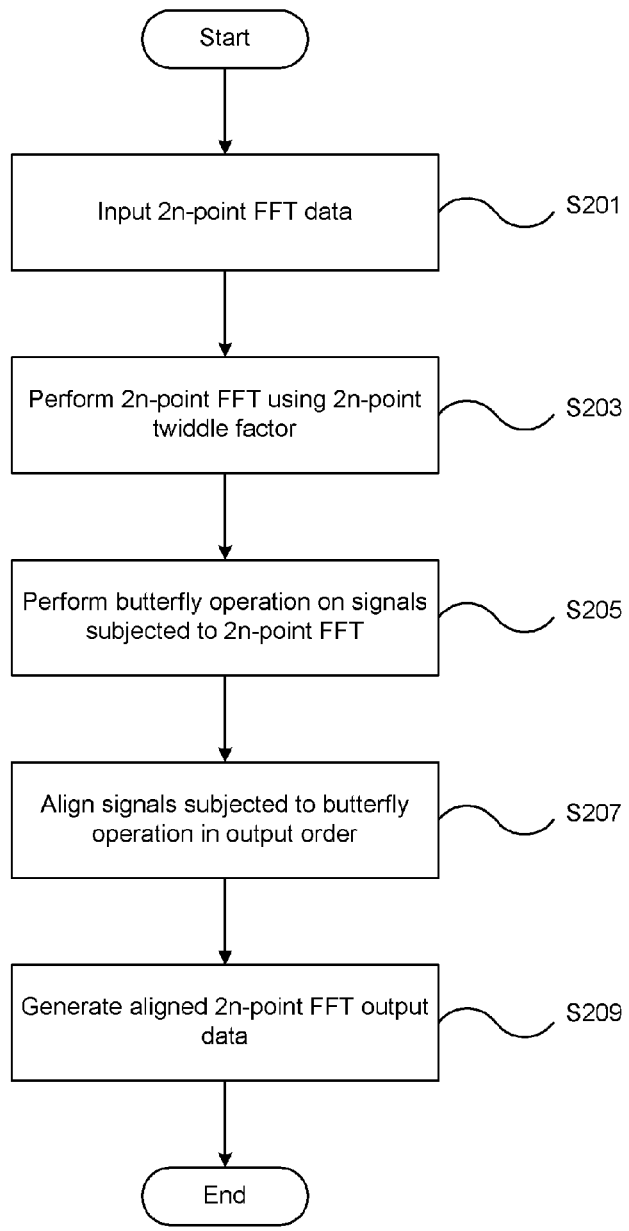
FIG. 7 is a flowchart illustrating a method of performing variable fast Fourier transform on 2n-point input data according to an exemplary embodiment of the present invention.

FIG. 7 is a flowchart illustrating a method of performing fast Fourier transform on 2n-point input data according to an exemplary embodiment of the present invention.

The flowchart shown in FIG. 7 corresponds to the structure shown in FIG. 4 and FIG. 5 in which 8-point FFT input data or 2048-point FFT input data is supplied.

That is, the variable FFT apparatus receives 2n-point input data (S201).

Then, 2n-point FFT twiddle factors for the 2n-point input data are selected to perform fast Fourier transform (S203).

Subsequently, a butterfly operation is performed on the signals that have been subjected to fast Fourier transform by using the 2n-point FFT twiddle factors (S205).

Then, the operated signals are aligned in an output order (S207).

A plurality of aligned 2n-point FFT output data are then generated (S209). The above-described embodiments of the present invention can be realized by programs having functions corresponding to the components of the embodiments of the invention and recording media having the programs stored therein as well as apparatuses and methods. In addition, those skilled in the art can easily realize the above-described embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. An apparatus for performing a variable fast Fourier transform (FFT) algorithm, comprising:
   a first storage unit that stores a first twiddle factor for fast Fourier transform of n-point input data (n is a specific number);
   a second storage unit that stores a second twiddle factor for fast Fourier transform of 2n-point input data; and
   a multiplexer that receives the twiddle factor from the first storage unit or the second storage unit according to whether the n-point input data or the 2n-point input data is supplied.

2. The apparatus of claim 1, wherein the 2n-point input data is classified into even-numbered input data and odd-numbered input data.

3. An apparatus for performing a variable fast Fourier transform (FFT) algorithm, comprising:
   two n-point FFT processors (n is a specific number) each of which selects an FFT twiddle factor for n-point input data or 2n-point input data, and performs fast Fourier transform;
   an input data aligning unit that classifies the 2n-point input data and alternately inputs the classified data to the two n-point FFT processors;
   a butterfly operation unit that receives data obtained by performing fast Fourier transform on the 2n-point input data from the two n-point FFT processors and performs a butterfly operation on the received data; and
   an output data aligning unit that receives the operated data from the butterfly operation unit and aligns the received data in an output order.

4. The apparatus of claim 3, wherein each of the two n-point FFT processors includes:
   a first storage unit that stores the twiddle factor for the n-point input data;
   a second storage unit that stores the twiddle factor for the 2n-point input data; and
   a multiplexer that selects one of the twiddle factors stored in the first and second storage units according to whether the n-point input data or the 2n-point input data is supplied.

5. The apparatus of claim 3, further comprising output data aligning units that receive n-point FFT output signals from the two n-point FFT processors.

6. The apparatus of claim 5, wherein the output data aligning unit for the 2n-point input data and the output data aligning unit for the n-point input data align output data in different orders.

7. The apparatus of claim 6, wherein the input data aligning unit classifies the 2n-point input data into even-numbered data and odd-numbered data, and inputs the classified data to the two n-point FFT processors.

8. A variable fast Fourier transform method using an apparatus for performing fast Fourier transform (FFT) on n-point input data (n is a specific number) or 2n-point input data, comprising:
   determining whether the n-point input data or the 2n-point input data is supplied;
   when determined that the n-point input data is supplied, selecting a twiddle factor for the n-point input data;
   when determined that the 2n-point input data is supplied, selecting a twiddle factor for the 2n-point input data; and
   performing fast Fourier transform using the selected twiddle factor.

9. The method of claim 8, wherein the 2n-point input data is classified into even-numbered input data and odd-numbered input data.

10. A variable fast Fourier transform method using an apparatus for performing fast Fourier transform (FFT) on n-point input data (n is a specific number) or 2n-point input data, comprising:
    determining whether the n-point input data or the 2n-point input data is received;
    when determined that the n-point input data is received, performing the fast Fourier transform using a twiddle factor for the n-point input data to generate a first output; and
    when determined that the 2n-point input data is received, performing the fast Fourier transform using a twiddle factor for the 2n-point input data to generate a second output.

11. The method of claim 10, wherein the generating of the first output includes:
    selecting the twiddle factor for the n-point input data to perform the fast Fourier transform and outputting the transformed data; and
    aligning the output data that has been subjected to the fast Fourier transform in an output order to generate output for the n-point input data.

12. The method of claim 10, wherein the generating of the second output includes:
    classifying the 2n-point input data into even-numbered input data and odd-numbered input data;
    selecting the twiddle factors for the classified 2n-point input data to perform the fast Fourier transform and outputting the transformed data;
    performing a butterfly operation on the output data that has been subjected to the fast Fourier transform and outputting the operated data; and
    aligning the output data in an output order to generate output for the 2n-point input data.

13. The method of claim 12, wherein the output data are aligned in different orders in the generating of the output for the n-point input data and the generating of the output for the 2n-point input data.

* * * * *